June 20, 1961    W. HOFFMANN    2,989,064
DOSING APPARATUS FOR LIQUIDS
Filed Feb. 11, 1958
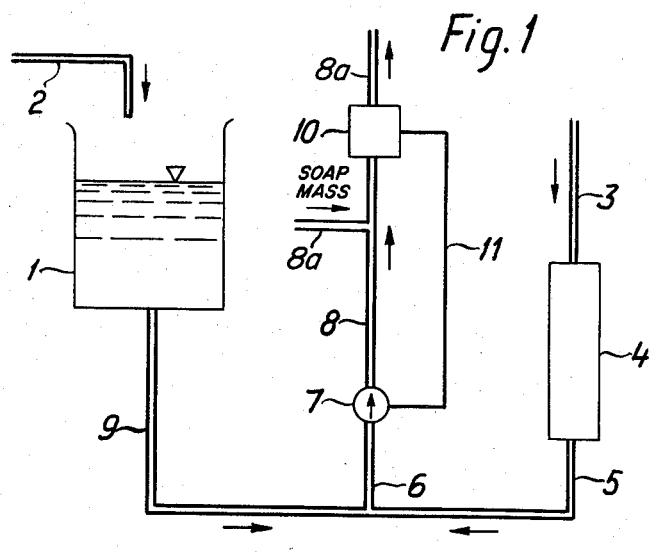
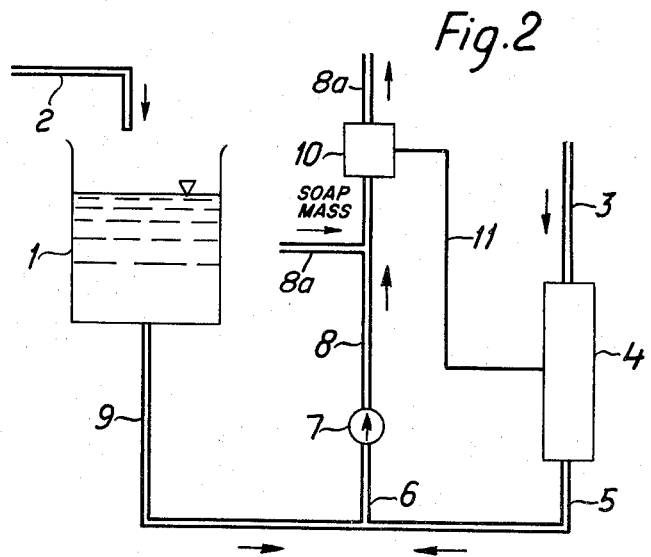
INVENTOR
Walter Hoffmann
BY
Davis, Hoxie & Faithfull
ATTORNEYS

United States Patent Office 2,989,064
Patented June 20, 1961

2,989,064
DOSING APPARATUS FOR LIQUIDS
Walter Hoffmann, Lidingo, Sweden, assignor to Aktiebolaget Separator, Stockholm, Sweden, a corporation of Sweden
Filed Feb. 11, 1958, Ser. No. 714,638
Claims priority, application Sweden Feb. 14, 1957
3 Claims. (Cl. 137—92)

This invention relates to an improved dosing apparatus for regulating the supply one liquid to another, as for controlling the concentration of a mixture of the liquids.

In Swedish Patent No. 149,125, dated March 8, 1955, there is disclosed a method for continuous making of soap, in which an electrolyte solution (lye or salt solution) is fed to a stage of the soap making plant in a quantity controlled by a dosing means. The latter, in its turn, is checked by a viscometer which indicates changes in the soap mass viscosity, which depends partly upon the electrolyte content of the soap mass. An impulse from the viscometer, indicating for instance an increased demand for electrolyte, is transmitted to the dosing means which operates in that case to increase its dosage of the electrolyte solution. If the required amount of electrolyte is exceeded, an impulse from the viscometer causes the dosing means to reduce the dosage of the electrolyte, which in the plant according to the above-mentioned patent is presumed to consist of a solution of constant concentration. If this is assumed to be 10%, it means that an addition of 1 gram of electrolyte is accompanied by 9 grams of water. In the case where the dosing means is to increase the electrolyte, if large amounts of water accompany the electrolyte, it will take a longer time before the desired electrolyte balance in the soap mass is attained than if the electrolyte to be added is given in a more concentrated form. This means that the larger the quantity of water accompanying the electrolyte to be added, the greater the amplitude of the oscillations in the electrolyte content of the soap mass around the value to be kept. The great oscillation amplitude has been found to involve practical difficulties in that the soap mass composition varies during the process in respective stages in the soap making plant. Thus, 25% nigre may occasionally be obtained in the fitting stage, instead of for instance the 10% nigre desired.

The principal object of the present invention is to counteract too strong variations in the nature of the soap mass in respective treating stages, so that it is kept as constant as possible. The invention can be utilized, however, not only when dosing lye or salt solution in soap making but also in other processes where it is desired to add, in a dosed quantity, a liquid mixture whose composition for purposes of control must be varied during the dosing proper.

The new dosing apparatus for liquids comprises a pump and a controlling device which is situated after the pump, as counted in the flow direction of the dosed liquid. The essential characteristic of the dosing apparatus is that there is connected to the inlet side of the pump a liquid line with a dosing means which is inserted therein and adapted to feed out liquid at a rate which is below the throughput rate of the pump, and there is also connected to the inlet side of the pump another liquid line which unrestrainedly lets through liquid at a rate corresponding to the difference between the throughput rate of the pump and that of the dosage from the dosing means. Either the pump means or the dosing means works with constant throughput rate, while the other of these two means works with variable throughput rate, the variably working means being adapted for control by the controlling device.

The invention is described in more detail below, reference being made to the accompanying drawing in which FIGS. 1 and 2 are schematic views of two embodiments of the new dosing apparatus.

In FIG. 1, a tank 1 is assumed to be filled with concentrated (about 26%) common salt solution. Refilling of such solution takes place through a line 2. Through a line 3, water is fed to a dosing means 4. The latter may be of the piston or gear pump type which independently of the counter-pressure feeds out a quantity of water which is unchanged per unit of time, through its discharge line 5. If the pressure conditions are constant in the dosing means 4, it may consist of a valve. The entire water quantity discharged from dosing means 4 passes through line 5 and a pipe line 6 to a pump 7, which may also be of the piston or gear type, whose throughput capacity, continuously or discontinuously, is variable from a lower to a higher value, and inversely. The variation of the throughput capacity during the operation of the pump 7 may be obtained with either type of pump by changing the r.p.m. of the pump, and also by changing the stroke length in a piston pump.

The pump 7 is assumed to be capable of feeding 5 litres of salt solution per minute through the line 8. The dosing means 4 is further assumed to be adjusted for feeding out constantly 3 litres of water per minute through the line 5. Concentrated salt solution runs at the same time unrestrainedly from the tank 1 through a pipe line 9 to the line 6 where it joins the water coming from the line 5. Because the supply from the tank 1 is unrestrained or free-flowing, the difference between the throughput capacity of the pump 7 and the water amount coming from the dosing means 4 is always supplied from the tank 1. That is, two litres of concentrated salt solution will be fed per minute to the pump 7 through the line 9, so that a 10% salt solution is discharged from the pump 7 with the above assumptions.

Let it now be assumed that the pump 7 is adjusted to a throughput rate of 5.5 litres of liquid per minute. As illustrated, this adjustment is effected by a control device 10 in the form of a viscometer inserted in conduit 8a for passage of the soap mass in a soap making plant, as disclosed for example in said Swedish Patent No. 149,125, the viscometer adjusting the pump 7 through an operating connection 11. This will cause the amount of concentrated salt solution fed per minute to the pump 7 to increase from 2.05 to 2.5 litres, while the rate of feed of water from the line 5 remains the same. The amount of water accompanying half a litre of the concentrated salt solution consists of 3/8 litres. However, if the same salt addition had been given with 10% salt solution (in a dosage of 5 litres/min. from the pump 7), a water addition of 9/8 litres would have been obtained, that is, threefold the quantity of water added in the instant case. Inversely, a rapid reduction of the salt content in the solution discharging from the pump 7 is attained when the pump, through an impulse from the viscometer 10, is adjusted to a reduced throughput capacity. Hence, it is apparent that a more rapid restoration of the desired salt content balance is attained with the present invention than if said balance had been controlled by means of a salt solution of constant concentration.

In FIG. 2, I have shown a somewhat different embodiment in which the pump 7 is designed to work with constant throughput rate, while the dosage from the means 4 is varied. Here, the impulses from the controlling device 10 actuate the dosing means 4 so that the latter varies the supply of water to the pump 7. Filling solution is supplied, as in FIG. 1, through the line 9. In this case too, the salt solution discharging from the pump 7 is given changed concentration in response to impulses from the control device 10. For example, if the latter operates to reduce the flow rate through dosing means 4, the concentration is rapidly increased due to a corresponding increase in the flow rate of concentrated salt solution through liquid line 9.

I claim:
1. In a system having a conduit for passage of a fluid mass to be controlled by regulated addition of a liquid to said mass, a dosing apparatus for said liquid, which comprises a pump means for the dosed liquid, a control device located in said conduit and responsive to variations in the concentration of said liquid in said mass, a pipe line connecting the discharge side of the pump means to the control device by way of said conduit, a first liquid pipe line connected to the inlet side of the pump means, a dosing means located in said first liquid pipe line and operable to feed liquid to the pump means at a throughput rate below the throughput rate of the pump means, a free-flowing liquid pipe line connected to the inlet side of the pump means and operable to feed liquid thereto at a rate corresponding to the difference between said throughput rates of the pump means and the dosing means, one of said means having a constant throughput rate and the other means being operable at a variable throughput rate, and an operative connection between said other means and the control device through which said device is operable upon a change in said concentration to vary the throughflow rate of said other means in the direction to counteract said change.

2. A dosing apparatus according to claim 1, in which said other means operable at a variable throughput rate is the pump means.

3. A dosing apparatus according to claim 1, in which said other means operable at a variable throughflow rate is the dosing means.

References Cited in the file of this patent

UNITED STATES PATENTS

| | | |
|---|---|---|
| 1,789,386 | Kalle | Jan. 20, 1931 |
| 2,590,538 | Huck | Mar. 25, 1952 |
| 2,818,246 | Kappel | Dec. 31, 1957 |
| 2,880,654 | Henry | Apr. 7, 1959 |
| 2,896,656 | Allen | July 28, 1959 |

FOREIGN PATENTS

| | | |
|---|---|---|
| 51,869 | Norway | Dec. 19, 1932 |